US011214100B2

(12) United States Patent
Nakajima (10) Patent No.: US 11,214,100 B2
(45) Date of Patent: Jan. 4, 2022

(54) TIRE

(71) Applicant: Sumitomo Rubber Industries, Ltd., Hyogo (JP)

(72) Inventor: Koichi Nakajima, Kobe (JP)

(73) Assignee: Sumitomo Rubber Industries, Ltd., Hyogo (JP)

(*) Notice: Subject to any disclaimer, the term of this patent is extended or adjusted under 35 U.S.C. 154(b) by 546 days.

(21) Appl. No.: 16/038,920

(22) Filed: Jul. 18, 2018

(65) Prior Publication Data

US 2019/0039421 A1 Feb. 7, 2019

(30) Foreign Application Priority Data

Aug. 3, 2017 (JP) .............................. JP2017-150920
Mar. 26, 2018 (JP) .............................. JP2018-058486

(51) Int. Cl.
*B60C 11/02* (2006.01)
*B60C 11/13* (2006.01)
*B60C 11/03* (2006.01)
*B60C 11/04* (2006.01)
*B60C 11/12* (2006.01)

(52) U.S. Cl.
CPC ...... *B60C 11/1315* (2013.01); *B60C 11/0327* (2013.01); *B60C 11/042* (2013.01); *B60C 11/045* (2013.01); *B60C 11/1236* (2013.01); *B60C 11/1323* (2013.01);
(Continued)

(58) Field of Classification Search
CPC ........... B60C 2011/133; B60C 11/1323; B60C 11/042; B60C 2011/0341
See application file for complete search history.

(56) References Cited

U.S. PATENT DOCUMENTS 2,327,057 A    8/1943  Ofensend
2,843,172 A *  7/1958  Berry .................... B60C 11/045
                                              152/209.21
(Continued)

FOREIGN PATENT DOCUMENTS

DE    102010017702 A1    1/2012
DE    102013107343 A1    1/2015
(Continued)

OTHER PUBLICATIONS

Extended European Search Report issued by the European Patent Office dated Jan. 2, 2019, which corresponds to EP18185564.4-1012 and is related to U.S. Appl. No. 16/038,920.

*Primary Examiner* — Alison L Hindenlang
*Assistant Examiner* — Debjani Roy
(74) *Attorney, Agent, or Firm* — Studebaker & Brackett PC (57) ABSTRACT

A tire comprises a tread portion 2. The tread portion 2 is provided with at least one main groove 3 extending continuously in a tire circumferential direction. A first groove wall 10, which is one of groove walls of the main groove 3, is provided with at least one first recessed portion 11 recessed outwardly in a groove width direction from a corresponding one of groove edges 6 of the main groove on a ground contacting surface of the tread portion 2. In the first recessed portion 11, a recess amount from the corresponding one of the groove edges 6 gradually decreases toward both sides in the tire circumferential direction from a deepest portion 15 recessed most outwardly in the groove width direction.

19 Claims, 7 Drawing Sheets

(52) U.S. Cl.
CPC . *B60C 2011/0341* (2013.01); *B60C 2011/133* (2013.01); *B60C 2200/04* (2013.01)

(56) References Cited

U.S. PATENT DOCUMENTS

| | | | | |
|---|---|---|---|---|
| 3,462,328 | A * | 8/1969 | Buckland | B60C 11/1346 264/269 |
| 6,302,174 | B1 * | 10/2001 | Suzuki | B60C 11/0302 152/209.15 |
| 6,412,531 | B1 * | 7/2002 | Janajreh | B60C 11/045 152/209.21 |
| 6,595,254 | B2 * | 7/2003 | Iizuka | B60C 11/0309 152/209.21 |

FOREIGN PATENT DOCUMENTS

| | | | |
|---|---|---|---|
| EP | 1524131 A2 | | 4/2005 |
| GB | 2329161 | * | 3/1999 |
| JP | 2000-016026 A | | 1/2000 |
| JP | 2005-001593 A | | 1/2005 |
| JP | 2014-213731 A | | 11/2014 |
| JP | 2016-124442 A | | 7/2016 |

* cited by examiner

TIRE

TECHNICAL FIELD

The present invention relates to a tire having a tread portion provided with a main groove.

BACKGROUND ART

For example, Japanese Unexamined Patent Application Publication No. 2016-124442 has proposed a tire in which a tread portion is provided with a main groove. One of groove walls of the main groove is inclined toward an outer side of the main groove with respect to a normal line of a ground contacting surface of the tread portion from a side of the ground contacting surface to a side of a groove bottom thereof. The main groove having the groove walls configured as such is advantageous for maintaining drainage performance of the tread portion after wearing.

However, parts on a side of groove edges of land regions divided by the main groove tend to collapse toward a groove center of the main groove with a connecting portion between the groove wall and a groove bottom portion as a fulcrum during running. Thereby, the above tire has a room for improvement with respect to steering stability on a dry road surface.

SUMMARY OF THE INVENTION

The present invention was made in view of the above problems, and a primary object thereof is to provide a tire capable of exerting excellent wet performance over a long period of time while securing the steering stability.

In one aspect of the present invention, a tire comprises a tread portion wherein the tread portion is provided with at least one main groove extending continuously in a tire circumferential direction, a first groove wall, which is one of groove walls of the main groove, is provided with at least one first recessed portion recessed outwardly in a groove width direction from a corresponding one of groove edges of the main groove on a ground contacting surface of the tread portion, and in the first recessed portion, a recess amount from the corresponding one of the groove edges gradually decreases toward both sides in the tire circumferential direction from a deepest portion recessed most outwardly in the groove width direction.

In another aspect of the invention, it is preferred that the first recessed portion is provided on a side of a groove bottom of the groove wall.

In another aspect of the invention, it is preferred that the first recessed portion has a contour portion formed in an arcuate shape in a cross section passing through the deepest portion and taken in parallel with the ground contacting surface.

In another aspect of the invention, it is preferred that in a lateral cross-sectional view of the first recessed portion passing through the deepest portion, the recess amount gradually decreases outwardly in a tire radial direction from the deepest portion.

In another aspect of the invention, it is preferred that the recess amount at the deepest portion is in the range of from 0.1 to 0.5 times a groove width, which is a length between the groove edges, of the main groove.

In another aspect of the invention, it is preferred that the first groove wall is provided with at least one second recessed portion recessed outwardly in the groove width direction from the corresponding one of the groove edges and having the recess amount from the corresponding one of the groove edges constant in the tire circumferential direction.

In another aspect of the invention, it is preferred that a maximum recess amount of the second recessed portion is smaller than the recess amount at the deepest portion of the first recessed portion.

In another aspect of the invention, it is preferred that the first groove wall has the first recessed portions and the second recessed portions arranged alternately in the tire circumferential direction.

In another aspect of the invention, it is preferred that a second groove wall, which is the other one of the groove walls of the main groove, is provided with at least one first recessed portion.

In another aspect of the invention, it is preferred that each of the first groove wall and the second groove wall is provided with a plurality of the first recessed portions, and the first recessed portions provided in the first groove wall and the first recessed portions provided in the second groove wall are arranged alternately in the tire circumferential direction.

In another aspect of the invention, it is preferred that the main groove includes a first main groove and a second main groove adjacent to each other, and in each of the first main groove and the second main groove, the first recessed portions provided in the first groove wall and the first recessed portions provided in the second groove wall are arranged alternately in the tire circumferential direction in the same phase with each other.

In another aspect of the invention, it is preferred that the tire further comprises a sipe extending outwardly in the groove width direction from the main groove, wherein the sipe is connected with the first recessed portion.

DESCRIPTION OF THE PREFERRED EMBODIMENT

An embodiment of the present invention will now be described in detail in conjunction with accompanying drawings.

Figure 1:
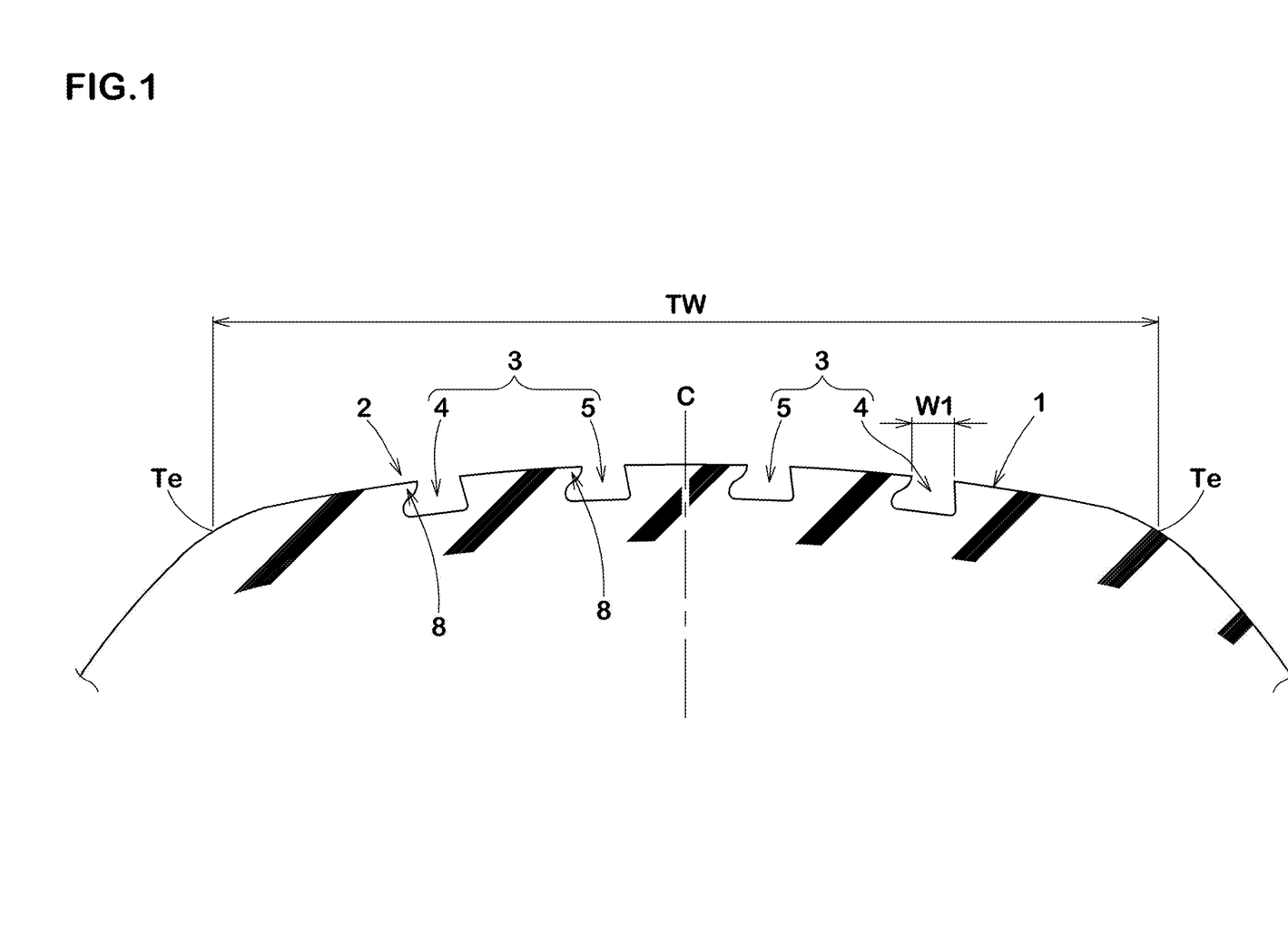
FIG. 1 is a lateral cross-sectional view of a tread portion of a tire in this embodiment.

FIG. 1 is a lateral cross-sectional view of a tread portion 2 of a tire 1 in this embodiment. Note that FIG. 1 is a meridian section passing through a tire rotational axis of the tire 1 in a standard state. The tire 1 in this embodiment is suitably used as a pneumatic tire for a passenger car, for example. However, it is not limited to such an embodiment, and the tire 1 of the present invention may be used as a tire for heavy load.

The "standard state" is a state in which the tire is mounted on a standard rim, inflated to a standard inner pressure, and loaded with no tire load. Hereinafter, dimensions and the like of various parts of the tire 1 are those measured under the standard state, unless otherwise noted.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard inner pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

As shown in FIG. 1, the tread portion 2 is provided with at least one main groove 3 extending continuously in a tire circumferential direction. In this embodiment, in each half in a tire axial direction of the tread portion, a first main groove 4 and a second main groove 5 adjacent to each other in a tire axial direction are respectively provided between a tire equator (C) and respective one of tread edges (Te). The first main groove 4 is provided on a side of the tread edge (Te), for example. The second main groove 5 is provided between the first main groove 4 and the tire equator (C). Thereby, the tread portion 2 in this embodiment is provided with four main grooves 3. However, the present invention is not limited to such an embodiment.

The tread edges (Te) are defined as outermost ground contacting positions in the tire axial direction when the tire 1 in the standard state is in contact with a flat surface with zero camber angles by being loaded with a standard tire load.

The "standard tire load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

It is preferred that a groove width W1 of each of the main grooves 3 is in the range of from 3.0% to 6.0% of a tread width TW, for example. Note that, in this specification, unless otherwise noted, the groove width of the main groove means a length between the groove edges thereof on the ground contacting surface of the tread portion 2. The tread width TW is a distance in the tire axial direction of the tire in the standard state between one of the tread edges (Te) and the other one of the tread edges (Te). In the case of a pneumatic tire for a passenger car, it is preferred that a groove depth of each of the main grooves 3 is in the range of from 5 to 10 mm, for example.

Figure 2:
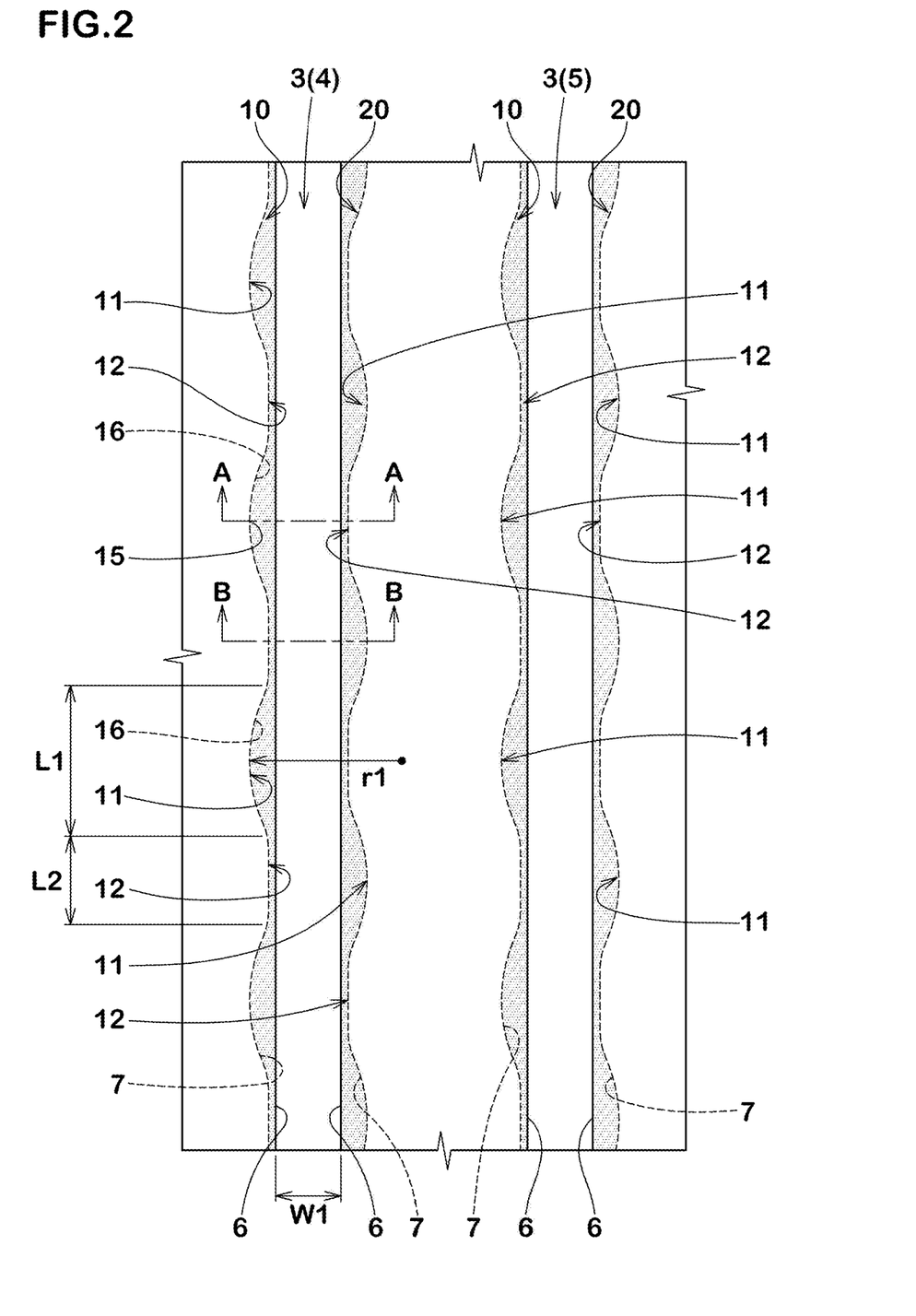
FIG. 2 is an enlarged plan view of a first main groove and a second main groove of FIG. 1.

FIG. 2 is an enlarged plan view of one of the first main grooves 4 and its adjacent one of the second main grooves 5 as a drawing showing a configuration of the main grooves 3. As shown in FIG. 2, a first groove wall 10, which is one of the groove walls of each of the main grooves 3, is provided with at least one first recessed portion 11. Each of the first groove walls 10 in this embodiment is provided with a plurality of first recessed portions 11.

For the ease of understanding the invention, in FIG. 2, groove edges 6 of the main grooves 3 are indicated by solid lines, and contours 7 of the groove walls in a plan view of the tread portion 2 are indicated by broken lines. Further, recessed regions between the groove edges 6 of the main grooves 3 and the contours 7 of the groove walls are hatched. Each of the first recessed portions 11 is recessed outwardly in a groove width direction from the respective groove edge 6 on the ground contacting surface of the tread portion 2. With the first recessed portions 11, as the tread portion 2 wears, an opening area of each of the main grooves 3 increases, therefore, excellent wet performance is exerted over a long period of time.

In each of the first recessed portions 11, a recess amount from the respective groove edge 6 gradually decreases toward both sides in the tire circumferential direction from a deepest portion 15 recessed most outwardly in the groove width direction. Thereby, rigidity of land regions divided by the main grooves 3 is secured on both sides in the tire circumferential direction of each of the deepest portions 15, therefore, it is possible that each of groove edge side portions 8 (shown in FIG. 1) of the land regions are suppressed from collapsing toward a groove center of the respective one of the main grooves 3. Further, the first recessed portions 11 smoothly changes the rigidity of the land regions in the tire circumferential direction, therefore, local deformation of the groove edge side portions 8 is suppressed. Therefore, it is possible that excellent steering stability is obtained.

In general, main grooves continuously extending in the tire circumferential direction discharge water to the rear side in the tire running direction during running on a wet road surface, but when the amount of water on the road surface is large, they tend to push a part of the water to the front side in the tire running direction. In the main groove 3 of the present invention, the first recessed portions 11 mentioned above can push a part of the water to the front side in the tire running direction and to the outer side in the tire axial direction, therefore, the displaced water is consequently suppressed from getting into the gap between the tread portion 2 and the road surface. Further, the groove area increases as the wear proceeds, therefore, as compared with conventional grooves, it is possible that the decrease of the groove volume associated with the progress of the wear is delayed.

Each of the first recessed portions 11 has a contour portion 16 smoothly curved and recessed in a cross section passing through the respective deepest portion 15 and taken in parallel with the ground contacting surface of the tread portion 2, for example. Each of the first recessed portions 11 in this embodiment has the contour portion 16 formed in an arcuate shape, for example. The first recessed portions 11 configured as such makes it easier to take out ribs for forming the main grooves of a vulcanization mold at the time of vulcanization molding (hereinafter, such effect may be referred to as "improved mold releasability").

The shapes of the main grooves in this embodiment can improve the mold releasability as described above, therefore, it is possible that a large groove volume is secured, thereby, it is possible that high wet performance is exerted consequently. Further, the main grooves in this embodiment are also helpful for maintaining air column resonance sound during running at a low level.

It is preferred that, in each of the first recessed portions 11, the curvature of the arcuate contour portion in a cross section taken in parallel with the ground contacting surface of the tread portion 2 gradually increases toward the inner side in a tire radial direction. The first recessed portions 11 configured as such can secure large groove volume of the main grooves 3 while suppressing deformation of the groove edge side portions 8.

In this embodiment, a radius of curvature (r1) of each of the contour portions 16 is in the range of from 1.5 to 3.0 times the groove width W1, for example. A length L1 in the tire circumferential direction of each of the first recessed portions 11 is in the range of from 2.0 to 3.0 times the groove width W1 of each of the main grooves 3, for example.

Figure 3A:
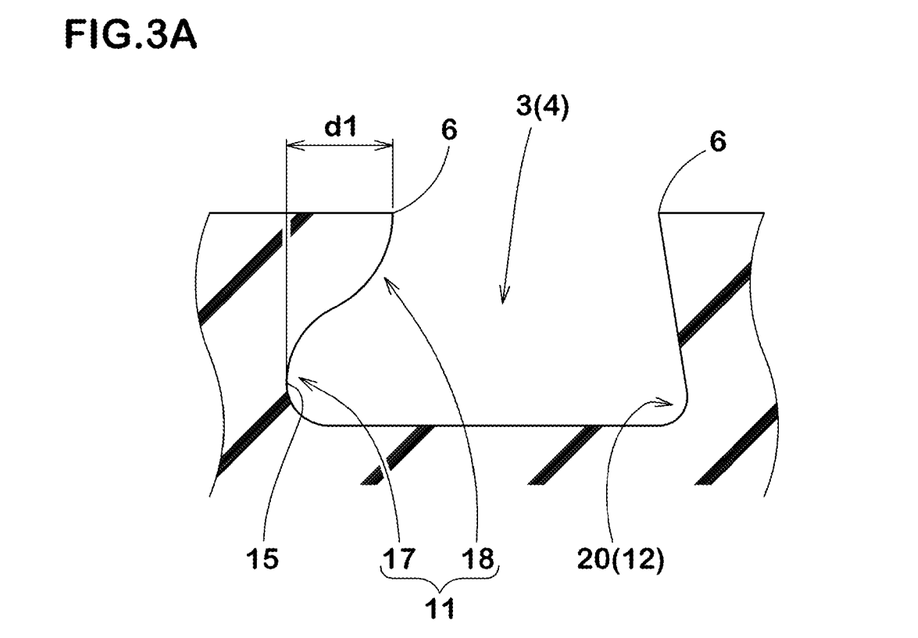
FIG. 3A is a cross-sectional view taken along A-A line of FIG. 2.

FIG. 3A is a cross-sectional view taken along A-A line of FIG. 2 and corresponds to a lateral cross-sectional view of one of the main grooves passing through the deepest portion 15 of one of the first recessed portions 11 provided in one of the first groove walls 10. As shown in FIG. 3A, it is preferred that each of the first recessed portions 11 is provided on a side of the groove bottom of the respective groove wall of the main grooves 3.

Each of the first recessed portions 11 in this embodiment includes a concave surface portion 17 recessed toward the outer side in the groove width direction, and a convex surface portion 18 connected with the concave surface portion 17 on the outer side thereof in the tire radial direction and convex toward a side of a groove center line of the respective main groove 3, for example. It is preferred that each of the concave surface portions 17 and the convex surface portions 18 is curved in a smooth arc shape. However, each of the first recessed portions 11 is not limited to such an embodiment, and may have a flat surface formed between the deepest portion 15 and the groove edge 6, for example.

It is preferred that, in each of the first recessed portions 11 in the lateral cross-sectional view passing through the respective deepest portion 15, the recess amount gradually decreases radially outwardly from the respective deepest portion 15. In order to secure the groove volume of the main grooves 3, a recess amount (d1) at each of the deepest portions 15 from the groove edge 6 is preferably not less than 0.10 times, more preferably not less than 0.30 times the groove width W1 (shown in FIG. 2), which is a length between the groove edges of each of the main grooves 3. Further, in order to improve the mold releasability, it is preferred that the recess amount (d1) is not more than 0.50 times the groove width W1.

As shown in FIG. 2, it is preferred that each of the first groove walls 10 is further provided with at least one second recessed portion 12. As a preferred embodiment, each of the first groove walls 10 is provided with a plurality of the second recessed portions 12. As a further preferred embodiment, each of the first groove walls 10 in this embodiment is provided with the first recessed portions 11 and the second recessed portions 12 arranged alternately in the tire circumferential direction. Each of the second recessed portions 12 is recessed outwardly in the groove width direction from the respective groove edge 6 and the recess amount from the groove edge 6 is constant in the tire circumferential direction.

It is preferred that each of the second recessed portions 12 has a length in the tire circumferential direction smaller than that of each of the first recessed portions 11, for example. It is preferred that a length L2 in the tire circumferential direction of each of the second recessed portions 12 is in the range of from 0.45 to 0.60 times the length L1 in the tire circumferential direction of each of the first recessed portions 11, for example. The second recessed portions 12 configured as such can improve the steering stability and the wet performance in a good balance.

Figure 3B:
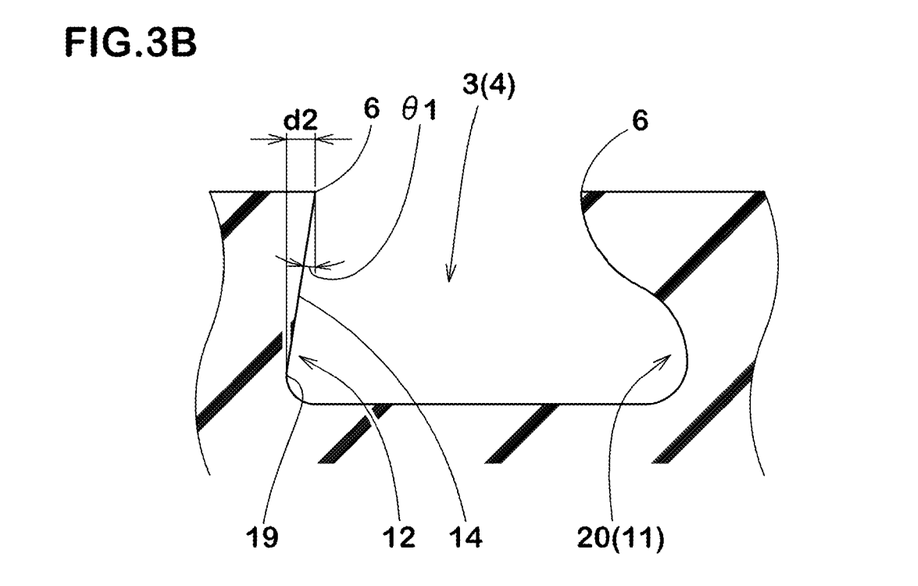
FIG. 3B is a cross-sectional view taken along B-B line of FIG. 2.

FIG. 3B is a cross-sectional view taken along B-B line of FIG. 2 and corresponds to a lateral cross-sectional view of one of the main grooves passing through one of the second recessed portions 12 provided in one of the first groove walls 10. As shown in FIG. 3B, each of the second recessed portions 12 has a flat surface 14 arranged between a deepest portion 19 and the respective groove edge 6, for example. The second recessed portions 12 configured as such are helpful for improving the mold releasability.

It is preferred that an angle $\theta 1$ of the flat surface 14 of each of the second recessed portions 12 is in the range of from 5 to 15 degrees, for example. The angle $\theta 1$ is an angle between the flat surface 14 and the tread normal line passing through the respective groove edge 6. The second recessed portions 12 configured as such can improve the mold releasability and the wet performance after the tread portion is worn in a good balance.

From the same point of view, it is preferred that a maximum recess amount (d2) of each of the second recessed portions 12 is smaller than a recess amount (d1) of the deepest portion 15 of each of the first recessed portions 11. Specifically, it is preferred that the recess amount (d2) of each of the second recessed portions 12 is in the range of from 0.05 to 0.15 times the groove width W1 of each of the main grooves 3.

As shown in FIG. 2, a second groove wall 20, which is another groove wall, of each of the main grooves 3 is provided with at least one first recessed portion 11 described above. Further, the second groove wall 20 is provided with at least one second recessed portion 12 described above. Note that a lateral cross-sectional view of the second recessed portion 12 provided in the second groove wall 20 is shown in FIG. 3A, and a lateral cross-sectional view of the first recessed portion 11 provided in the second groove wall 20 is shown in FIG. 3B.

As shown in FIG. 2, in a preferred embodiment, each of the second groove walls 20 is provided with a plurality of the first recessed portions 11 and a plurality of the second recessed portions 12. As a further preferred embodiment, each of the second groove walls 20 in this embodiment is provided with the first recessed portions 11 and the second recessed portions 12 arranged alternately in the tire circumferential direction. Thereby, the steering stability when the tire is newly used and the wet performance after the tread portion is worn are improved in a good balance.

In each of the main grooves in this embodiment, each of the first recessed portions 11 provided in the second groove wall 20 faces respective one of the second recessed portions 12 provided in the first groove wall 10, for example. Each of the second recessed portions 12 provided in the second groove wall 20 faces respective one of the first recessed portions 11 provided in the first groove wall 10, for example. Thereby, the first recessed portions 11 provided in the first groove wall 10 and the first recessed portions 11 provided in the second groove wall 20 are arranged alternately in the tire circumferential direction, for example. The first main groove 4 configured as such can exert excellent mold releasability. Further, such arrangement of the recessed portions can suppress increase in the air column resonance sound generated in the main groove.

In the first main groove 4 and the second main groove 5, the first recessed portions 11 provided in the first groove wall 10 and the first recessed portions 11 provided in the second groove wall 20 are arranged alternately in the tire circumferential direction in the same phase with each other. In other words, each of the first recessed portions 11 of the first groove wall 10 of the first main groove 4 is adjacent in the tire axial direction to respective one of the first recessed portions 11 provided in the groove wall on the same side (the groove wall on the left side in FIG. 2) of the second main groove 5. Similarly, each of the first recessed portions 11 provided in the second groove wall 20 of the first main groove 4 is adjacent in the tire axial direction to respective one of the first recessed portions 11 provided in the groove wall on the same side (the groove wall on the right side in FIG. 2) of the second main groove 5. Thereby, lateral rigidity of the land region defined between the first main groove 4 and the second main groove 5 is secured, therefore, excellent steering stability is exerted.

Figure 4:
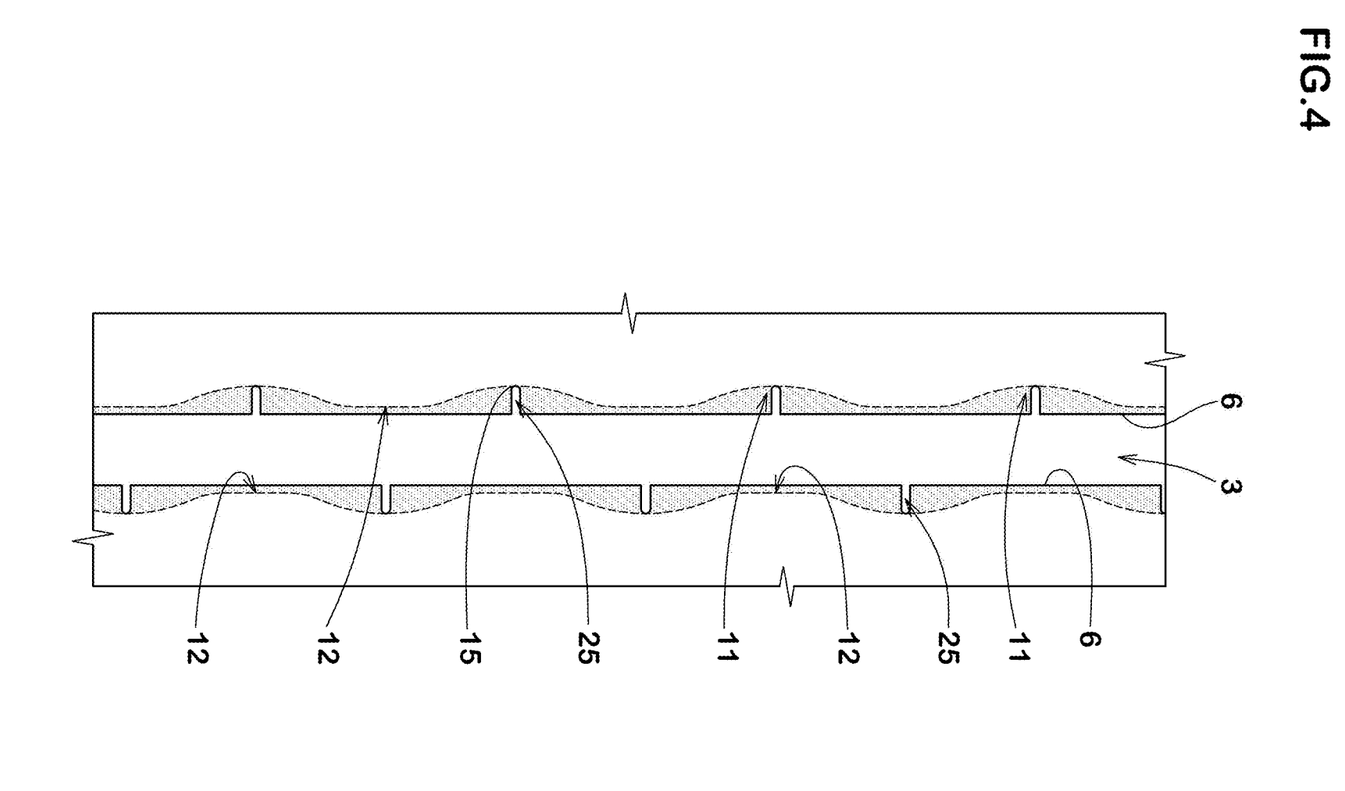
FIG. 4 is an enlarged view of one of the main grooves according to another embodiment of the present invention.

FIG. 4 is an enlarged view of one of the main grooves 3 according to another embodiment of the present invention. In FIG. 4, the same reference numerals are given to the elements common to the embodiment described above, and the explanation thereof is omitted here.

As shown in FIG. 4, in this embodiment, sipes 25 each extending outwardly in the groove width direction from the main groove 3 are provided. Each of the sipes 25 is connected with the respective one of the first recessed portions 11 described above. Each of the first recessed portions 11 in this embodiment is provided with one sipe 25. Each of the first recessed portions 11 may be provided with a plurality of the sipes 25, for example. In a more preferred embodiment, each of the sipes 25 is connected with the deepest portion 15 of respective one of the first recessed portions 11. The sipes 25 configured as such open moderately when the rib for forming the main groove of the vulcanization mold is taken out from the tread portion 2, therefore, it is possible that the rib is easily taken out. Thereby, the recess amount of each of the first recessed portions 11 can be further increased, therefore, it is possible that the wet performance is further improved. Note that, in this specification, each of the sipes 25 means a cut or a groove having a width less than 1.5 mm.

Each of the sipes 25 in this embodiment has the same length in the tire axial direction as the recess amount of the deepest portion 15 of each of the first recessed portions 11, for example. However, the present invention is not limited to such an embodiment, and in another embodiment, each of the sipes 25 may have the length in the tire axial direction larger than the recessed amount of each of the deepest portions 15. The sipes 25 configured as such can further improve the mold releasability.

Figure 5A:
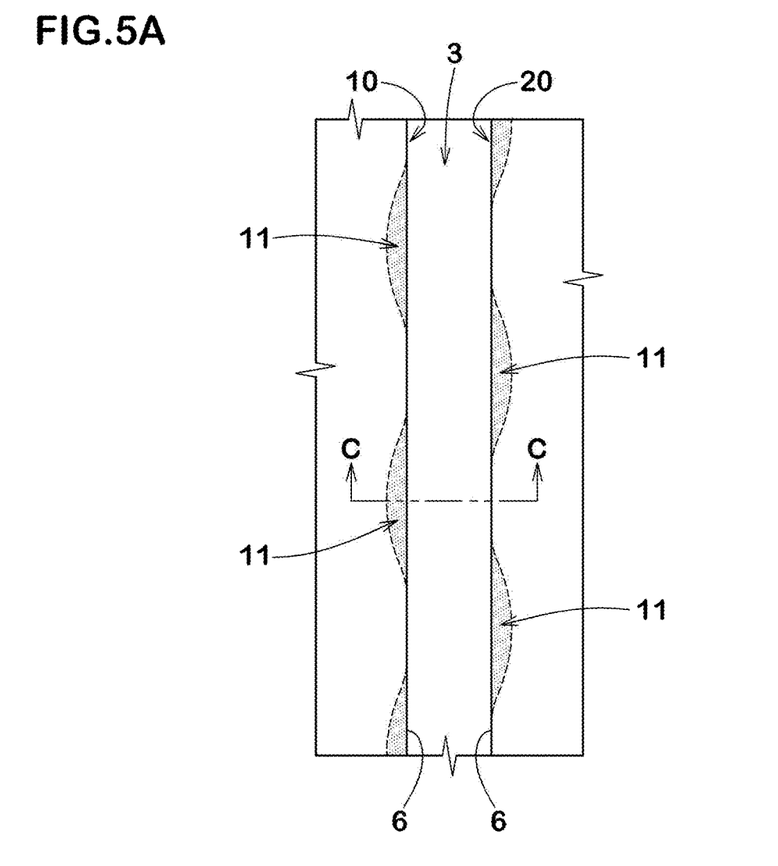
FIG. 5A is an enlarged view of one of the main grooves according to yet another embodiment of the present invention.
Figure 5B:
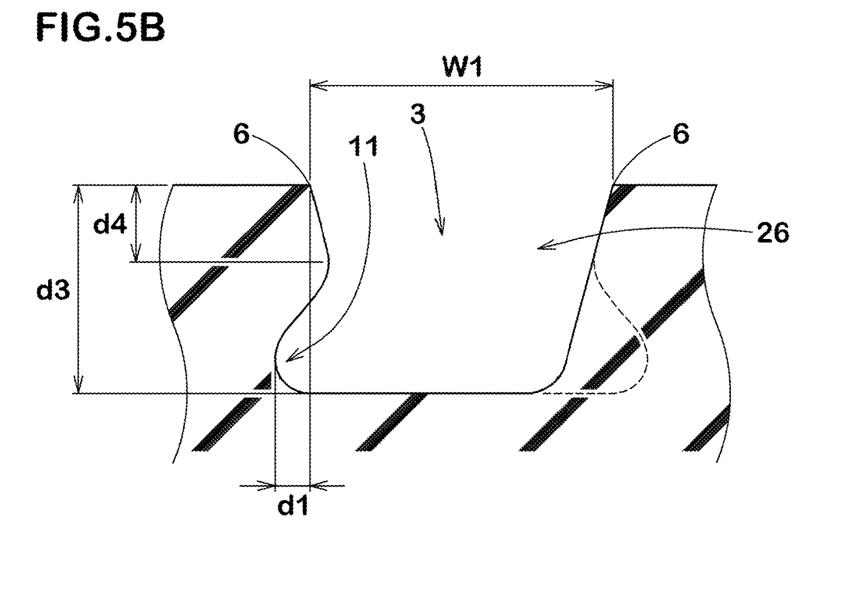
FIG. 5B is a cross-sectional view taken along C-C line of FIG. 5A.

FIG. 5A is an enlarged view of the main groove 3 in yet another embodiment of the present invention. FIG. 5B is a cross-sectional view of the main groove 3 shown in FIG. 5A taken along C-C line. As shown in FIGS. 5A and 5B, the main groove 3 in this embodiment has a groove width gradually decreasing portion 26 in which the groove width gradually decreases radially inwardly from the groove edges 6, for example. Further, each of the first recessed portions 11 is arranged on an inner side in the tire radial direction of the groove width gradually decreasing portion 26. The main groove 3 configured as such can further suppress deformation of parts of the land regions on sides of the groove edges when the tire is newly used, therefore, excellent steering stability can be obtained.

The groove width gradually decreasing portion 26 extends in the tire circumferential direction with a constant cross-sectional shape, for example. It is preferred that a depth (d4) of the groove width gradually decreasing portion 26 is in the range of from 0.30 to 0.50 times a depth (d3) of the main groove 3, for example.

A plurality of the first recessed portions 11 are provided in the tire circumferential direction on the inner side in the tire radial direction of the groove width gradually decreasing portion 26, for example. In this embodiment, the first recessed portions 11 provided in the first groove wall 10 and the first recessed portions 11 provided in the second groove wall 20 are arranged alternately in the tire circumferential direction on the inner side in the tire radial direction of the groove width gradually decreasing portion 26. The main groove 3 configured as such suppresses local deformation of the land regions, therefore, it is possible that the wet performance is exerted over a long period of time while ensuring excellent steering stability.

While detailed description has been made of embodiments of the present invention, the present invention can be embodied in various forms without being limited to the illustrated embodiments.

Working Example (Example)

Figure 6:
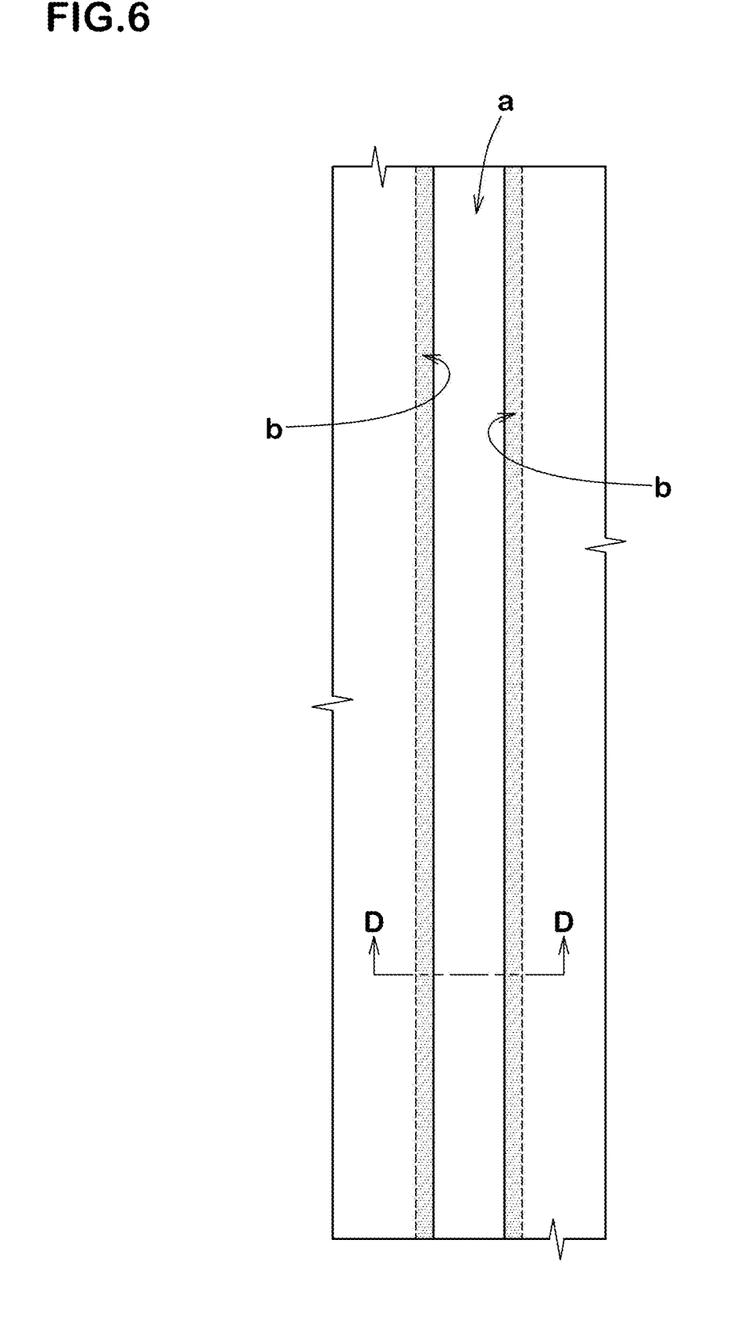
FIG. 6 is an enlarged plan view of one of the main grooves of Reference.

Tires of size 185/65R15 having the main grooves described above were made by way of test according to the specification listed in Table 1. As Reference 1, tires having the main grooves shown in FIG. 6 were made by way of test. As shown in FIG. 6, a main groove (a) of the tire as the Reference 1 is provided with recessed portions (b) each extending constantly in the tire circumferential direction are provided on the groove walls on both sides. Note that the groove volume of the main groove (a) of the Reference 1 is the same as the groove volume of the main groove of Example 1. The steering stability and the wet performance after the wear is tested for each of the test tires. Common specifications of the test tires and the test methods are as follows.

<Steering Stability>

The test tires were mounted on four wheels of an FF passenger car with a displacement of 2000 cc under the following conditions, then while a driver drove the test car on a dry road surface, the steering stability was evaluated by the driver's feeling. The results are indicated by an index based on the Reference 1 being 100, wherein the larger the numerical value, the better the steering stability is.

Tire rim: 15×6.0J

Tire inner pressure: 220 kPa at front wheels, 210 kPa at rear wheels

<Wet Performance after Wear>

By using an inside drum testing machine, while the test tires were run on the drum surface covered by 5.0 mm depth of water under the following conditions, the speed when hydroplaning phenomenon occurred was measured. The results are indicated by an index based on the Reference 1 being 100, wherein the larger the numerical value, the higher the measured speed, which shows better wet performance.

Test tire: tread portion was worn so that depth of main groove is 50% of that of new tire Slip angle: 1.0 degree Vertical load: 4.2 kN The test results are shown in Table 1.

TABLE 1

|  | Ref. 1 | Ex. 1 | Ex. 2 | Ex. 3 | Ex. 4 | Ex. 5 | Ex. 6 | Ex. 7 |
| --- | --- | --- | --- | --- | --- | --- | --- | --- |
| FIG. showing shape of Main groove | FIG. 6 | FIG. 2 | FIG. 2 | FIG. 2 | FIG. 2 | FIG. 2 | FIG. 2 | FIG. 2 |
| Recess amount (d1) at Deepest portion of First recessed portion/Groove width W1 of Main groove | — | 0.40 | 0.20 | 0.60 | 0.80 | 0.40 | 0.40 | 0.40 |
| Maximum recess amount (d2) of Second recessed portion/Groove width W1 of Main groove | — | 0.10 | 0.10 | 0.10 | 0.10 | 0.05 | 0.15 | 0.20 |
| Steering stability [evaluation point] | 100 | 107 | 108 | 105 | 103 | 108 | 105 | 104 |
| Wet performance after wear [index] | 100 | 102 | 100 | 104 | 105 | 101 | 104 | 104 |

From the test results, it was confirmed that the tires as Examples (Examples 1 to 7) maintained the wet performance even when they were worn while ensuring better steering stability than the Reference 1. In particular, the shape of the recessed portions of the present invention was excellent in the mold releasability, therefore, it was possible that the recess amounts of the recessed portions were increased, thereby, it was confirmed that it was possible that the wet performance was further improved (Examples 3, 4, 6, and 7).

Figure 7:
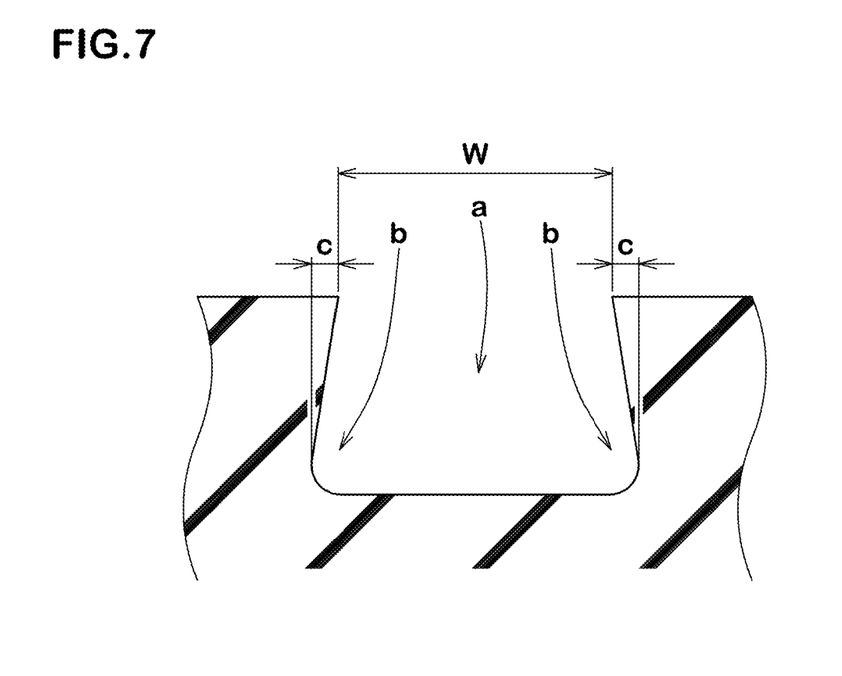
FIG. 7 is a cross-sectional view taken along D-D line of FIG. 6.

As Examples 8 to 12, tires of size 185/65R15 having the main grooves shown in FIGS. 2 and 3 or FIGS. 5A and 5B were made by way of test. As the Reference 1, the tires having the main grooves shown in FIGS. 6 and 7 were made by way of test. FIG. 6 is a plan view showing the shape of the main groove (a) of the Reference 1, and FIG. 7 is a cross-sectional view taken along D-D line of FIG. 6 and shows the cross-sectional shape of the main groove (a) of the Reference 1. As shown in FIG. 7, a recess amount (c) of each of the recessed portions (b) of the Reference 1 is 0.1 times a groove width (W) of the main groove (a). Each of the test tires was configured so that the groove volume of each of the main grooves in a 50% worn state is as shown in Table 2. The 50% worn state is a state in which the tread portion is worn so that the depth of each of the main grooves is 50% of that of a new tire. Note that, in the Table 2, the groove volume of each of the test tires is indicated by an index based on the groove volume of the Reference 1 being 100.

Regarding the above test tires, the steering stability when the test tires were newly used, noise performance when the test tires were newly used, the wet performance after wear, and the mold releasability were tested. The test methods were as follows.

<Steering Stability when Newly Used>

While a driver drove the test car on a dry road surface, the steering stability mainly when the test tires were newly used was evaluated by the driver's feeling. The results are indicated by an evaluation point based on the Reference 1 being 100, wherein the larger the numerical value, the better the steering stability is.

<Noise Performance when Newly Used>

The air column resonance sound generated in the main grooves was measured while the test car was run at the speed of 100 km/h on a dry road surface with the test tires newly mounted on the test car. The results are indicated by an index based on the value of the Reference 1 being 100, wherein the smaller the numerical value, the smaller the air column resonance sound generated in the main grooves is, which is better.

<Wet Performance after Wear>

The test tires were tested in the same way as the "Wet Performance after Wear" described above. The results are indicated by an index based on the Reference 1 being 100, wherein the larger the numerical value, the higher the speed when hydroplaning phenomenon occurred, which shows the better wet performance.

<Mold Releasability>

With respect to each of the test tires, the presence or absence of cracks in the groove walls of the main grooves caused by demolding after vulcanization molding was confirmed.

"Good" indicates that the cracks did not occur and the tire was in a good condition, "Not good" indicates that the cracks occurred and the tire was in a condition not suitable for running.

The test results are shown in Table 2.

TABLE 2

|  | Ref. 1 | Ex. 8 | Ex. 9 | Ex. 10 | Ex. 11 | Ex. 12 |
| --- | --- | --- | --- | --- | --- | --- |
| FIG. showing plan view shape of Main groove | FIG. 6 | FIG. 2 | FIG. 2 | FIG. 2 | FIG. 5A | FIG. 5A |
| FIG. showing cross-sectional shape of Main groove | FIG. 7* | FIG. 3 | FIG. 3 | FIG. 3 | FIG. 5B | FIG. 5B |
| Recess amount (d1) at Deepest portion of First recessed portion/Groove width W1 of Main groove | — | 0.10 | 0.30 | 0.50 | 0.10 | 0.30 |
| Maximum recess amount (d2) of Second recessed portion/Groove width W1 of Main groove | — | 0.05 | 0.10 | 0.10 | — | — |
| Groove volume of Main groove in 50% worn state | 100 | 99 | 110 | 130 | 98 | 101 |
| Steering stability when newly used [evaluation point] | 100 | 107 | 103 | 100 | 110 | 105 |
| Noise performance when newly used [index] | 100 | 97 | 100 | 100 | 96 | 96 |
| Wet performance after wear [index] | 100 | 102 | 105 | 107 | 100 | 103 |
| Mold releasability |  | Good | Good | Good | Good | Good |

*Recess amount (c) of Recessed portion (b) of Reference 1 is 0.1 times Groove width (w) of Main groove (a).

As shown in the Table 2, it was confirmed that the tires of the present invention could exert high wet performance even when the tread portion was worn while improving the steering stability when the tires were newly used.

In particular, in Examples 11 and 12, it was confirmed that the above-mentioned effects were obtained while improving the noise performance when the tires were newly used.

The invention claimed is:

1. A tire comprising a tread portion wherein
the tread portion is provided with at least one main groove extending continuously in a tire circumferential direction,
a first groove wall, which is one of groove walls of the main groove, is provided with at least one first recessed portion which is undercut so as to be recessed outwardly in a groove width direction from a corresponding one of groove edges of the main groove on a ground contacting surface of the tread portion, and
in the first recessed portion, a recess amount from the corresponding one of the groove edges gradually decreases toward both sides in the tire circumferential direction from a deepest portion recessed most outwardly in the groove width direction, wherein
the first groove wall is provided with at least one second recessed portion which is undercut so as to be recessed outwardly in the groove width direction from the corresponding one of the groove edges and having the recess amount from the corresponding one of the groove edges constant in the tire circumferential direction; and
the second recessed portion has a length in the tire circumferential direction smaller than that of the first recessed portion.

2. The tire according to claim 1, wherein
the first recessed portion is provided on a side of a groove bottom of the groove wall.

3. The tire according to claim 1, wherein
the first recessed portion has a contour portion formed in an arcuate shape in a cross section passing through the deepest portion and taken in parallel with the ground contacting surface.

4. The tire according to claim 1, wherein
in a lateral cross-sectional view of the first recessed portion passing through the deepest portion, the recess amount gradually decreases outwardly in a tire radial direction from the deepest portion.

5. The tire according to claim 1, wherein
the recess amount at the deepest portion is in the range of from 0.1 to 0.5 times a groove width, which is a length between the groove edges, of the main groove.

6. The tire according to claim 1, wherein
a maximum recess amount of the second recessed portion is smaller than the recess amount at the deepest portion of the first recessed portion.

7. The tire according to claim 1, wherein
the first groove wall has the first recessed portions and the second recessed portions arranged alternately in the tire circumferential direction.

8. The tire according to claim 1, wherein
a second groove wall, which is the other one of the groove walls of the main groove, is provided with at least one first recessed portion.

9. The tire according to claim 8, wherein
each of the first groove wall and the second groove wall is provided with a plurality of the first recessed portions, and
the first recessed portions provided in the first groove wall and the first recessed portions provided in the second groove wall are arranged alternately in the tire circumferential direction.

10. The tire according to claim 9, wherein
the main groove includes a first main groove and a second main groove adjacent to each other, and
in each of the first main groove and the second main groove, the first recessed portions provided in the first groove wall and the first recessed portions provided in the second groove wall are arranged alternately in the tire circumferential direction in the same phase with each other.

11. The tire according to claim 1 further comprising a sipe extending outwardly in the groove width direction from the main groove, wherein
the sipe is connected with the first recessed portion.

12. The tire according to claim 2, wherein
the first recessed portion has a contour portion formed in an arcuate shape in a cross section passing through the deepest portion and taken in parallel with the ground contacting surface.

13. The tire according to claim 2, wherein
in a lateral cross-sectional view of the first recessed portion passing through the deepest portion, the recess amount gradually decreases outwardly in a tire radial direction from the deepest portion.

14. The tire according to claim 3, wherein
in a lateral cross-sectional view of the first recessed portion passing through the deepest portion, the recess amount gradually decreases outwardly in a tire radial direction from the deepest portion.

15. The tire according to claim 2, wherein
the recess amount at the deepest portion is in the range of from 0.1 to 0.5 times a groove width, which is a length between the groove edges, of the main groove.

16. The tire according to claim 3, wherein
the recess amount at the deepest portion is in the range of from 0.1 to 0.5 times a groove width, which is a length between the groove edges, of the main groove.

17. The tire according to claim 4, wherein
the recess amount at the deepest portion is in the range of from 0.1 to 0.5 times a groove width, which is a length between the groove edges, of the main groove.

18. The tire according to claim 1, wherein the at least one first recessed portion and the at least one second recessed portion are provided on a same first groove wall.

19. The tire according to claim 1, wherein the at least one first recessed portion is connected with the at least one second recessed portion.

* * * * *